F. W. HUTCHINS.
MEASURING DEVICE.
APPLICATION FILED FEB. 7, 1921.
1,414,571.
Patented May 2, 1922.
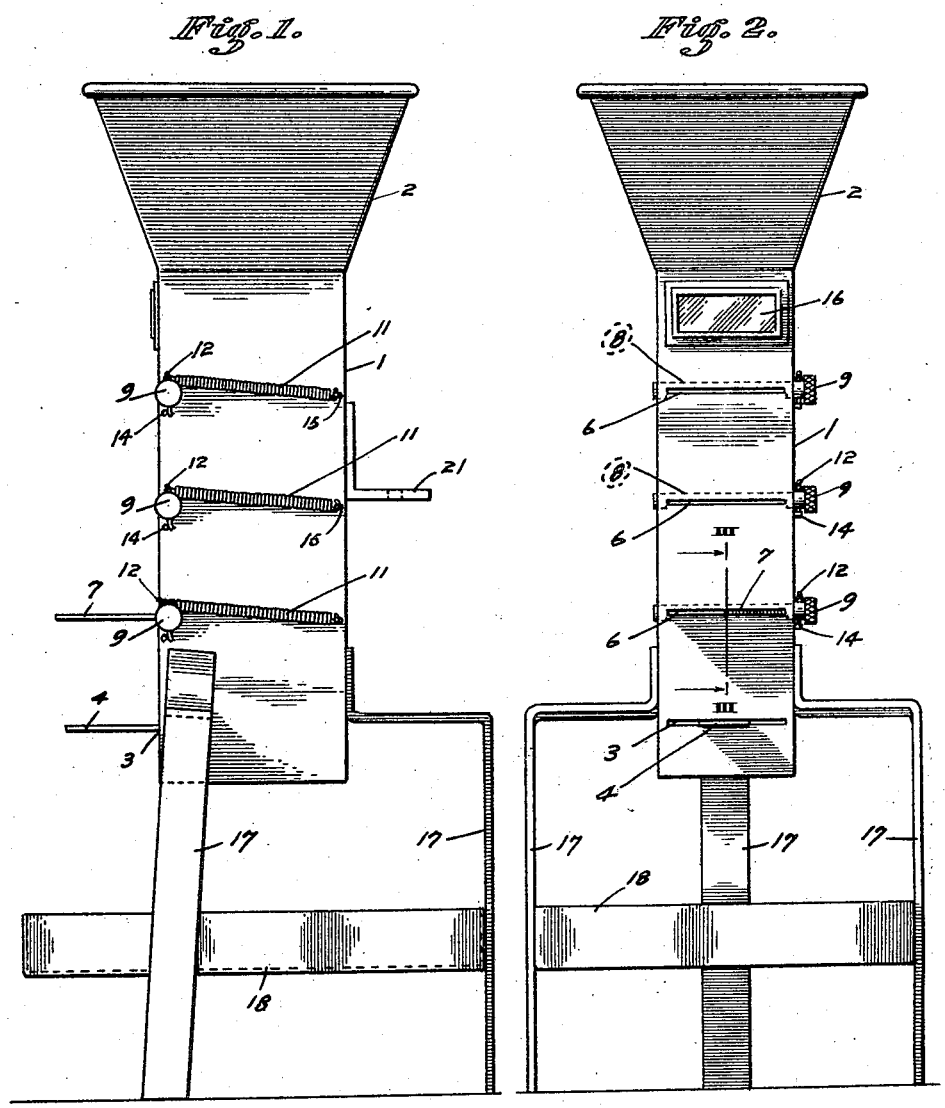
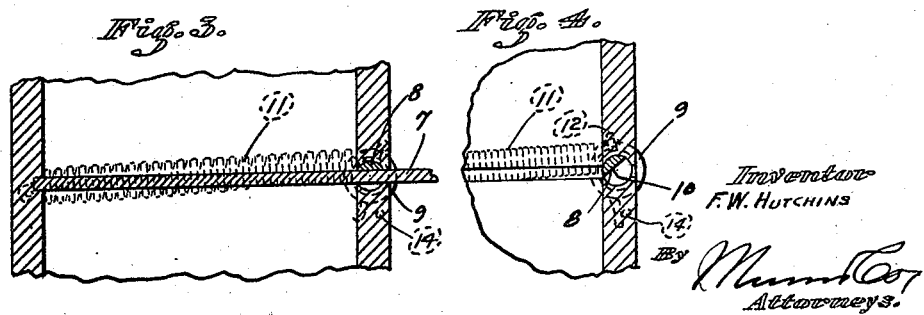
Inventor
F. W. HUTCHINS

UNITED STATES PATENT OFFICE.

FRANK WERTLEY HUTCHINS, OF MIAMI, ARIZONA.

MEASURING DEVICE.

1,414,571.  Specification of Letters Patent.  Patented May 2, 1922.

Application filed February 7, 1921. Serial No. 443,185.

*To all whom it may concern:*

Be it known that I, FRANK WERTLEY HUTCHINS, a citizen of the United States, and a resident of Miami, county of Gila, and State of Arizona, have invented a new and useful Measuring Device, of which the following is a specification.

The present invention relates to a measuring device and its principal object is to provide a simple means by which groceries, such as coffee, dried beans, dried peas, sugar, rice, etc., usually sold by the pound, can be measured instead of weighed, a scale on the outside of the device indicating the weight of the amount measured. A further object is to provide a device which simplifies the weighing in so far as it does not require the careful balancing of the scales, adding a little, taking away a little, until the proper weight is obtained; but which will cut off the desired quantity from a larger amount, leaving no room for errors.

These objects are attained by means of the mechanism illustrated in the accompanying drawing, in which:—

Figure 1 represents a side view of my measuring device; Figure 2 is a front view of the same; Figure 3 is a detail sectional view along line 3—3 of Figure 2; and Figure 4 is a part of the same view, after a slide shown in Figure 3 has been removed.

Referring to the drawing more particularly, the numeral (1) indicates a vertical box of square or rectangular cross-section, open on top and at the bottom, and provided, at the top, with a hopper (2). Near the bottom a slot (3) is provided in the front wall of the box, adapted to receive the slide (4), which, when in place, furnishes a solid bottom for the box, so that nothing dumped into the box through the hopper will pass it. Starting from this bottom the vertical box is scaled upward, to indicate 1 pound, 2 pounds, 3 pounds and so on, preferably up to 10 pounds. Since the specific gravities of sugar, coffee, beans, etc., differ, it is understood, of course, that each product requires a different scale and a different measuring device. At each point of this scale a slot (6) is provided in the front wall of the box, care being taken that the slot is so arranged that the box contains the exact weight desired when it is filled flush with the bottom of the slot. Each slot is adapted to receive a slide (7) which, when inserted through the slot, will cut right through the column of sugar or other product contained in the box and separate from the rest of it the quantity which it is desired to obtain. To prevent leakage through the slot, I use a specific device. Parallel with each slot, its axis on a level with the top of the slot, a pin (8) is inserted in the front wall, being provided at one end with the milled head (9). Throughout the length of the slot one-half of the cross-section of pin (8) is cut away, leaving the cross-section semi-circular, as shown at (10). It will be seen that, when the position of the pin is such, that the flat part of its cross-section is at the bottom, the passage through the slot will be free for the slide (7). When the pin is turned to the right, the flat part will assume a nearly vertical position and the circular part will close up the slot. To actuate this pin automatically, I use the contraction spring (11), one end of which is fastened to the cross-pin (12) extending through the pin (8) near its head, outside the box, and the other end of which is fastened to the box in any convenient manner as shown at (15). The tendency of the spring is to turn the pin (8) to the right, that is to close the slot, but it is prevented from turning it more than about a quarter of a turn by the stud (14) which engages the other end of the cross-pin (12), when that position has been reached. Thus it will be seen, that the spring will close the slot by turning the semi-circular pin (8) to the right, but, this turn being limited to a one-quarter revolution, the pin will be left in a position where the slide can force an opening through the slot over the resistance of the spring, a close contact between the slide and the pin (8) being maintained continually through the action of the spring.

Near the top of the box, underneath the hopper, I provide a glass (16) so that the contents of the box can be easily examined and a somewhat uniform height maintained, so that the lower parts of the contents would be under about the same pressure all the time.

The device rests on three legs (17) which are bent outwardly so as to furnish sufficient room for a catch box (18) attached to the same at a convenient height. I further provide bracket (21) on the box which may be used for fastening the device to the counter.

The device works as follows: After inserting the bottom slide the box, which may have any number of slots, is filled up with the product it is gauged for, say sugar. Assuming that 3 pounds of sugar are wanted, the operator forces his slide through the slot gauged for 3 pounds, withdraws the bottom slide, and his 3 pounds of sugar will drop on the catch box.

I claim:

1. In a measuring box, a wall having a horizontal slot and means operatively associated therewith, rotatably mounted in the wall so as to normally close the slot but adapted to yield to the pressure of a slide inserted through the slot so as to allow the same to pass.

2. In a measuring box, a wall having a horizontal slot and a flattened pin rotatably mounted therein in operative proximity to the slot, yielding means for retaining the flat portion of the pin in angular position and sliding means for engaging the flat portion and forcing the same into a position allowing the sliding means to pass.

3. In a measuring box, a wall having a plurality of horizontal slots and means operatively associated with each slot rotatably mounted in the wall so as to normally close the same but adapted to yield to the pressure of a slide inserted through the slot so as to allow the same to pass.

4. In a measuring box, a wall having a plurality of horizontal slots and a flattened pin for each slot rotatably mounted therein in operative proximity to the slot, yielding means for retaining the flat portion of each pin in angular position, and sliding means for engaging the flat portion and forcing the same into a position allowing the sliding means to pass.

5. In a measuring device, a rectangular box, having a sliding bottom and a plurality of slots in one wall, a flattened pin for each slot rotatably mounted in said wall in operative proximity to its respective slot adapted to open and close the same.

FRANK WERTLEY HUTCHINS.